United States Patent [19]

Spinelli

[11] Patent Number: 5,057,578
[45] Date of Patent: Oct. 15, 1991

[54] SILICONE-CONTAINING BLOCK COPOLYMERS AND MACROMONOMERS

[75] Inventor: Harry J. Spinelli, Wilmington, Del.

[73] Assignee: E. I. Du Pont de Nemours and Company, Wilmington, Del.

[21] Appl. No.: 507,276

[22] Filed: Apr. 10, 1990

[51] Int. Cl.$^5$ ............................................. C08F 265/06
[52] U.S. Cl. .................................... 525/278; 525/203; 525/209; 526/262; 526/279; 528/280
[58] Field of Search ................. 526/262, 279; 525/203, 525/209, 278; 528/280

[56] References Cited

U.S. PATENT DOCUMENTS

| 3,786,116 | 1/1974 | Milkovich et al. | 525/276 |
| 3,808,178 | 4/1974 | Gaylord et al. | 528/26 |
| 4,120,570 | 10/1978 | Gaylord | 526/279 |
| 4,152,508 | 5/1979 | Ellis et al. | 526/279 |
| 4,189,546 | 2/1980 | Deichert et al. | 528/26 |
| 4,254,248 | 3/1981 | Friends et al. | 526/279 |
| 4,414,372 | 11/1983 | Farnham et al. | 526/262 |
| 4,417,034 | 11/1983 | Webster | 526/190 |
| 4,582,884 | 4/1986 | Ratkowski | 526/279 |
| 4,656,233 | 4/1987 | Hertler | 526/262 |
| 4,791,181 | 12/1988 | Pickering et al. | 526/262 |
| 4,806,605 | 2/1989 | Hertler | 526/279 |

FOREIGN PATENT DOCUMENTS

| 63-291925A | 5/1987 | Japan | 526/279 |
| 01004640A | 6/1987 | Japan | 526/279 |
| 329329A | 2/1988 | United Kingdom | 526/262 |

Primary Examiner—Joseph L. Schofer
Assistant Examiner—Alex H. Walker
Attorney, Agent, or Firm—Charles J. Shoaf

[57] ABSTRACT

Copolymeric macromonomers containing alkyl acrylate and methacrylate units and units of polysiloxanylalkyl esters of acrylic and/or methacrylic acids and a terminal carbon-carbon double bond organo group are useful for copolymerizing with other acrylate or methacrylate esters to make improved polymer compositions such as for contact lenses.

18 Claims, No Drawings

SILICONE-CONTAINING BLOCK COPOLYMERS AND MACROMONOMERS

FIELD OF THE INVENTION

This invention relates to novel linear acrylic block copolymers and macromonomers containing polysiloxanyl groups which can be used, for example, to improve the properties of polymer compositions used in contact lens applications.

BACKGROUND OF THE INVENTION

U.S. Pat. Nos. 3,808,178 and 4,120,570, issued to N. E. Gaylord in 1974 and 1978 respectively, concerns linear random copolymers of polysiloxanyl and alkyl acrylates and methacrylates which have increased oxygen permeability, as compared to the alkyl methacrylates alone for example. Use of the polymers in contact lenses for correcting visual defects of the human eye is taught. Further modifications of such polymers with an itaconate ester, and preferably including a crosslinking agent and a hydrophilic monomer, are disclosed in U.S. Pat. No. 4,152,508 issued to E. J. Ellis et al. (1979).

U.S. Pat. No. 4,254,248 issued to G. D. Friends et al. (1981) concerns acrylate and methacrylate soft contact lenses using as a comonomer polysiloxanes end-capped with polymerizable unsaturated groups. The copolymers have high tear strengths and a high modulus of elasticity. Such comonomers are also disclosed in U.S. Pat. No. 4,189,546 issued to W. G. Deichert et al. (1980) to make polymeric shaped articles for biomedical applications.

U.S. Pat. No. 3,786,116, issued to R. Milkovich et al. in 1974 discloses the use of macromonomers containing a polymerizable carbon-carbon double bond to make graft copolymers comprising a backbone polymer chain and bonded thereto a linear polymer which forms copolymerized sidechains on the backbone. In other words, the macromonomer is interposed between polymeric segments of the backbone polymer.

In the prior art, as represented for example by the above Gaylord patents, improvements in one polymer property by copolymerization, such as oxygen permeability, are frequently gained at the expense of another property, such as hardness or machineability. Optical clarity must remain unaffected as well. Improved methods and materials which can provide polymeric contact lens compositions having improved combinations of properties remain highly desirable.

An object of this invention is a novel acrylic block copolymer or macromonomer which is compatible with and can be used as a constituent in polymer compositions for contact lenses to provide improved properties. Another object is a novel macromonomer which can be incorporated into polysiloxanyl-, alkyl-(meth)acrylate copolymers (i.e. soluble in the other monomers) during bulk polymerization of the comonomers to provide a branched copolymer having a novel combination of oxygen permeability and hardness while not adversely affecting optical clarity.

SUMMARY OF THE INVENTION

This invention provides a novel silicone-containing acrylic block copolymer, preferably a macromonomer, comprised of:

(a) 10-90% by weight, preferably 25-75%, of one or more monomers having the formula

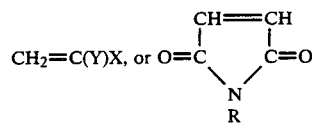

and mixtures thereof wherein: X is —CN, —CH=CH-C(O)X' or —C(O)X'; Y is —H, —CH$_3$, —CN or —CO$_2$R, provided, however, when X is —CH=CH-C(O)X', Y is —H or —CH$_3$; X' is —OSi(R)$_3$, —R, —OR or —NR'R"; each R is independently selected from C$_{1-20}$ alkyl, alkenyl, or alkadienyl or C$_{6-20}$ cycloalkyl, aryl, alkaryl or aralkyl, any of said groups optionally containing one or more ether oxygen atoms within aliphatic segments thereof and optionally containing one or more functional substituents that are unreactive under polymerizing conditions; and each of R' and R" is independently selected from C$_{1-4}$ alkyl; and (b) 90-10% by weight, preferably 75 to 25%, of one or more polysiloxanylalkyl esters having the formula

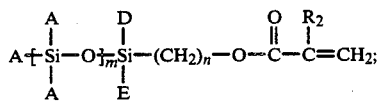

where D and E are selected from the group consisting of C$_1$-C$_5$ alkyl groups, phenyl groups, and groups of the structure

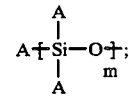

where A is selected from the group consisting of C$_1$-C$_5$ alkyl groups and phenyl groups; m is an integer from one to five; and n is an integer from one to three; R$_2$ is —H or —CH$_3$.

Preferably attached to only one end of said copolymer molecules, to form a macromonomer, is a terminal organo group containing a polymerizable carbon-carbon double bond.

Said double bond permits the macromonomer to copolymerize with other olefin monomers, especially (meth)acrylic monomers, to form branched copolymers of the olefin monomers and the macromonomer. Such copolymerization chemically incorporates the macromonomer into the copolymer as a side branch.

As used herein the term "(meth)acrylate" refers to methacrylate and/or acrylate groups.

DETAILED DESCRIPTION OF THE INVENTION

The copolymers of this invention are preferably block copolymers. In particular, the polysiloxanylalkyl ester units are in a single block segment of the molecule, which block is preferably adjacent to the terminal double-bond-containing organo group.

The double-bond-containing terminal group can be linked to the end of the copolymer by means of a urethane, ester, ether or amide linkage.

Representative monomers of the first (non-siloxanyl) group above include, but are not limited to, the following: methyl methacrylate (abbreviated herein as MMA), butyl methacrylate, ethyl methacrylate, methyl acrylate, ethyl acrylate, methacrylic acid, acrylic acid, hydroxyethyl methacrylate, hydroxyethyl acrylate, glyceryl methacrylate, sorbyl acrylate and methacrylate; 2-(dimethylamino)ethyl methacrylate, 2-(dimethylamino)ethyl acrylate; 3,3-dimethoxypropyl acrylate; 3-methacryloxypropyl acrylate; 2-acetoxyethyl methacrylate; p-tolyl methacrylate; 2,2,3,3,4,4,4-heptafluorobutyl acrylate; methylene malononitrile; ethyl 2-cyanoacrylate; N,N-dimethyl acrylamide; 4-fluorophenyl acrylate; 2-methacryloxyethyl acrylate and linoleate; propyl vinyl ketone ethyl 2-chloroacrylate; glycidyl methacrylate; 3-methoxypropyl methacrylate; 2[(1-propenyl)oxy]ethyl methacrylate and acrylate; phenyl acrylate; 2-(trimethyloloxy)ethyl methacrylate; allyl acrylate and methacrylate. Preferred monomers include methyl methacrylate, glycidyl methacrylate; sorbyl methacrylate; ethyl acrylate, butyl acrylate; sorbyl acrylate; 2-(trimethylsiloxy)ethyl methacrylate; 2-methacryloxyethyl acrylate, 2-acetoxyethyl methacrylate; and 2-(dimethylamino)ethyl methacrylate. Methyl methacrylate is most preferred because of its availability, cost and performance among other things.

Representative polysiloxanylalkyl ester monomers which can be employed include: pentamethyldisiloxanylmethyl methacrylate, heptamethyltrisiloxanylethyl acrylate, tris(trimethylsiloxy)-gamma-(methacryloxypropylsilane which is abbreviated as TRIS, phenyltetramethyldisiloxanylethyl acrylate, phenyltetraethyldisiloxanylether methacrylate, triphenyldimethyldisiloxanylmethyl acrylate, isobutylhexamethyltrisiloxanylmethyl methacrylate, methyldi(trimethylsiloxy)-methacryloxymethylsilane, n-propyloctamethyltetrasiloxanyl propyl methacrylate, pentamethyldi(trimethylsiloxy)-acryloxymethylsilane, t-butyltetramethyldisiloxanylethyl acrylate, n-pentylhexamethyltrisiloxanylmethyl methacrylate, and tri-i-propyltetramethyltrisiloxanylethyl acrylate.

Other useful macromonomer ingredients and polymerization techniques are found in U.S. Pat. No. 4,417,034—Webster, in columns 2-9 which is incorporated herein by reference.

In the preparation of the (meth)acrylic macromonomer block copolymers of the present invention, good use can be made of the known "group transfer" polymerization process of the general type described in part by W. B. Farnham and D. Y. Sogah, U.S. Pat. No. 4,414,372 and by O. W. Webster, U.S. Pat. No. 4,417,034 and in continuation-in-part U.S. Pat. Nos. 4,508,880, Webster, granted Apr. 2, 1985, and 4,524,196 Farnham and Sogah, granted June 18, 1985.

"Group transfer" initiators that are useful in the polymerization include but are not limited to the following: 1-(2-trimethylsiloxy)ethoxy-1-trimethylsiloxy-2-methylpropene, methoxy-[(2-methyl-1-propenyl)oxy]-trimethylsilane; (trimethysilyl)isobutyronitrile; ethyl 2-(trimethylsilyl)acetate; methyl 2-methyl-2-(tributylstannyl)propanoate; [(2-methyl-1-cyclohexenyl)oxy]-tributylstannane; trimethylsilyl nitrile; methyl 2-methyl-2-(trimethylgermanyl) propanoate; [(4,5-dihydro-2-furanyl)oxy]trimethylsilane; [(2-methyl-1-propenylidene)bis(oxy)]bis[trimethylsilane]; [(2-methyl-1-[2-methoxymethoxy)ethoxyl]-1-propenyl)oxy]trimethylsilane; methyl [2-methyl-l-(trimethylxilyloxy)-1-propenyl)oxy]acetate; [(1-(methoxymethoxy)-2-methyl-1-propenyl)-oxy]trimethylsilane; [(2-ethyl-1-propoxy-1-butenyl)oxy]-ethyldimethylsilane; ethyl 2-(trimethylstannyl)oxy]propanoate; [(2-methyl-1-butenylidene)bis(oxy)]bis[trimethylsilane]; 2-(trimethylsilyl)propanenitrile; ethyl(trimethylgermanyl)acetate; [(1-((1-dec-2-enyl)-oxy)-2-methyl-1-propenyl)oxy]-trimethylsilane; phenyl 2-methyl-2-(tributylstannyl)propanoate; methyl 2-(triethylsilyl)acetate; [(2-methyl-1-cyclohexeneyl)-oxy[-tributylstannane; [(1-methoxy-2-methyl-1-propenyl)oxy]phenyldimethylsilane.

Macromonomers of this invention are linear block polymers that have a polymerizable olefinic group at the end of the polymer chain. The polymerizable group may be, for example, a double bond from a methacryloxy, an acryloxy, a styrenic, an alpha methyl styrenic, an allylic, a vinylic, or other olefinic groups. Acrylic macromonomers can be prepared:

1) by the Group Transfer Polymerization process using functional initiators and a capping process to protect the functional group during polymerization;

2) by anionic polymerization followed by a capping process (as described by Milkovich and Chiang U.S. Pat. No. 3,786,116;

3) by free radical polymerization using functional chain transfer agents followed by a capping process (as described by Gillman and Senogles, *Polymer Lett.*, 5, 477 (1967)), or 4) by free radical polymerization using special cobalt catalysts (as described by Rizzardo, et al. *J. Macromol. Sci.-Chem.*, A23 (7), 839-852 (1986)). Group Transfer polymerization is the preferred method for making the block copolymeric macromonomers.

The macromonomers may range in molecular weight from 1,000 to 20,000. The preferred range is from 5,000 to 15,000.

Macromonomer block polymers found useful to modify other polysiloxanyl copolymers include but are not limited to the following [The values given represent the weight percent of each monomer in the polymer. A double slash indicates a separation between blocks, and a single slash indicates a random copolymer or random composition in a specific block ];

| Composition | Block Adjacent to Double Bond | Molecular Weight |
| --- | --- | --- |
| TRIS//MMA 40//60 | TRIS | 6,600 |
| TRIS//MMA 40//60 | TRIS | 10,600 |
| TRIS//MMA 40//60 | TRIS | 15,500 |
| TRIS//MMA 25//75 | TRIS | 10,600 |
| TRIS//MMA 75//25 | TRIS | 13,300 |
| TRIS//MMA 75//25 | TRIS | 6,600 |
| TRIS//MMA 83//17 | TRIS | 9,800 |
| TRIS/MMA 83/17 | RANDOM | 9,000 |

Preferred macromonomers are:

| Composition | Block Adjacent to Double Bond | Molecular Weight |
| --- | --- | --- |
| TRIS//MMA 40//60 | TRIS | 10,600 |
| TRIS//MMA 25//75 | TRIS | 10,600 |

Such macromonomers are especially amenable to forming comonomer syrups for bulk polymerization to form polymers for oxygen-permeable contact lenses.

Included in the composition of the macromonomers may also be some monomers whose function is to improve wetting or deposit resistance. Examples of these monomers include: methacrylic acid, acrylic acid, dimethylaminoethyl methacrylate, diethylaminoethyl methacrylate, glyceryl methacrylate.

Known conventional gas permeable lens formulations include slightly crosslinked copolymers of MMA and TRIS. The ratio of the two monomers is adjusted to optimize a balance of properties. As the level of TRIS monomer is increased, the permeability of the contact lens increases, but the hardness and flex resistance decreases. The amount of TRIS which can be used is limited by the minimum hardness that is acceptable for manufacturability. Typically, a minimum Shore D hardness of 70 is needed for good manufacturing (machineability) of lenses. This, in copolymers of the prior art, normally results in a maximum oxygen permeability (DK) of about 40.

Included in the composition of the macromonomers, may also be minor amounts (e.g. up to 10% by weight) of (meth)acrylate monomers whose function is to improve wetting or deposit resistance, in lens polymers for example. Examples of such monomers include: methacrylic acid, acrylic acid, dimethylaminoethyl methacrylate, diethylaminoethyl methacrylate, glyceryl methacrylate. Other polymers containing such monomers may be mixed with the macromonomers of this invention or in resulting lens compositions as well.

The polymerizable double bond can be in an organo group that is attached to an end of the macromonomer in the form of a methacryloxy, an acryloxy, a styrenic, an alpha methyl styrenic, an allylic, a vinylic, or other olefinic groups. It can be attached to the macromonomer by reacting a functional group on the macromonomer with compounds that contain a polymerizable double bond and react with said functional group. Such compounds include, for example, one that has a different functional group that can react with the first functional group and also contains a polymerizable double bond. Examples of such first functional groups that can be present on one end of the macromonomer include hydroxy, carboxylic acid, epoxy and aziridine. The functional group may initially be present in blocked form to protect it during polymerization of the macromonomer, which requires the removal of the blocking group before attachment of the polymerizable double bond group. The functional group may be incorporated in the macromonomer through use either of a functional initiator or of a functional terminal monomer. Examples of the second functional groups in the double-bond-containing compound include epoxy, hydroxy, acid, aziridine, isocyanate, acid chloride, anhydride, and ester.

Initiators having blocked hydroxyl groups which can be used include 1-(2-trimethylsiloxyethoxy)-1-trimethylsiloxy-2-methyl propene and 1-[2-(methoxymethoxy)ethoxy]-1-trimethylsiloxy-2methylpropene. Blocked hydroxyl monomers which can be used include 2-(trimethylsiloxy)ethyl methacrylate, 2-(trimethylsiloxy)propyl methacrylate, and 3,3-dimethoxypropyl acrylate. When the polymerization is completed, the blocking group is removed by hydrolysis to give a hydroxy functional polymer. Examples of hydroxy functional monomers which can be blocked include: 2-hydroxyethyl acrylate, 2-hydroxyethyl methacrylate, hydroxypropyl acrylate, and hydroxypropyl acrylate.

Upon unblocking, the hydroxy group is then reacted with compounds that can attach a polymerizable double bond group to the polymer. Examples of these include: 2-isocyanatoethyl methacrylate, methacryloyl chloride, acryloyl chloride, alpha-methylstyrene isocyanate, acrylic acid, methacrylic acid, anhydrides of acrylic and methacrylic acid, maleic anhydride, and esters of acrylic and methacrylic acids in transesterification reactions.

Blocked acid initiators which can be used include 1,1-bis(trimethylsiloxy)-2-methyl propene and 1,1-bis(trimethylsiloxy)propene. Blocked acid monomers which can be used include trimethylsiloxy methacrylate and 1-butoxyethyl methacrylate. When the polymerization is completed, the blocking group is removed to give an acid functional polymer. Acid monomers which can be used include acrylic acid, itaconic acid, and methacrylic acid.

The acid group is then reacted with compounds that can attach a polymerizable double bond group to the polymer. Examples of these include: glycidyl acrylate and methacrylate, aziridinyl acrylate and methacrylate, the hydroxy esters of acrylic and methacrylic acid.

The block copolymers and macromonomers of this invention have utility in polymer formulations, especially those of U.S. Pat. Nos. 3,808,178 and 4,120,570, for use in such diverse applications as release coatings, contact lenses, ocular membranes, intraocular implants, sizing agents, electronics adhesives, gas and liquid separation membranes, prostheses, and etching resists.

They are especially useful for incorporation into copolymers of the types disclosed in aforementioned U.S. Pat. Nos. 3,308,178 and 4,120,570 to N. E. Gaylord.

Test Methods

Oxygen Permeability

Oxygen permeabilities are determined using standard techniques, such as in ASTM-D-1434, as described for example in U.S. Pat. No. 3,808,178 at Column 4, lines 36–44.

The values given are the diffusion constants:

$$DK = X\ 10^{11} \frac{cm^3 cm}{s\ cm^2\ mm\ Hg}.$$

Hardness

A Shore D hardness tester was used in the conventional manner (e.g. ASTM E448-82) to determine hardness of buttons made either from a button mold or cut from a tube. A suitable tester is a Model D Hardness Tester from Shore Instrument and Manufacturing Co.

Swelling

A faced button was weighed and soaked in a container in heptane or ethyl alcohol for 18 hours. The container was placed in a water bath at room temperature. The button was taken out and wiped dry with a paper towel. The different in weight of the button before and after soaking is recorded and the percentage increase in weight is calculated based on the original weight of the button.

Comparative Examples

Not of the Invention

This describes the preparation of a conventional contact lens made with the random copolymerization of monomers.

Formulation

The following materials were mixed together: 51.8 gm of methyl methacrylate, MMA, 36.0 gm of 3-tris(-trimethylsiloxy)silanepropyl methacrylate, TRIS, 7.0 gm of N-vinyl pyrolidone, NVP, 5.0 gm of tetraethyleneglycol dimethacrylate, TEGMA, and 0.2 gm of "Vazo-52", a commercial free-radical initiator. The solution was poured in button molds, tubes, or in a caste base curve radius type mold.

Methods of Polymerization

Method 1: Thermal polymerization. The mixture was heated in the mold at 30° C. for 44 hours, then 4 hours at 45° C., finally 24 hours at 110° C.

Lens Manufacturing

A lathe cut lens from the samples using standard production procedures.

Results

The above formulation was used to make a lens that had a Shore D hardness of 75 and a DK of 17.0.

A series of six more polymers, and lenses thereof, was made and tested in substantially the same manner while varying the ratio of the TRIS and MMA monomers with the same amounts of NVP and TEGMA. The results are as follows:

| Comparison Run | Formulation (Wt. in gms) | | Properties | |
|---|---|---|---|---|
| | TRIS | MMA | DK | Hardness |
| 1 | 36 | 51.8 | 17 | 75 |
| 2 | 48 | 39.8 | 35 | 70 |
| 3 | 53 | 34.8 | 34.5 | 64 |
| 4 | 55 | 32.8 | 36.9 | 60.5 |
| 5 | 60 | 27.8 | 47.3 | 58 |
| 6 | 66 | 21.8 | 70.0 | 54.0 |
| 7 | 70 | 17.8 | Too soft | |

The above table shows results that are typically obtained with conventional random copolymerization of a hard monomer MMA and a permeable monomer TRIS. Lenses made with the formulations of Comparisons 4, 5, 6 and 7 are considered to be of inferior commercial quality. They were too soft to properly cut and lathe, were easily scratched, and were solvent sensitive, i.e., they had over 15% solvent swelling.

The results from Comparisons 1 to 7 are exemplary for lenses made from an random copolymerization of hard monomer such as MMA and a permeable monomer such as TRIS. These results show that as the level of permeable monomer is increased, the oxygen permeability is increased, but the hardness of the lens decreases.

In the above formulations the N-vinyl pyrrolidone was added to improve the wetting characteristics of the finished lens. Other wetting monomers that could have been used include methacrylic acid, acrylic acid, hydroxyethyl methacrylate, and glyceryl methacrylate. It is thought that their use at less than 10% does not affect either the permeability or hardness of the lenses.

The tetraethylene glycol dimethacrylate was added to crosslink the lens and improve the swell resistance of the finished lens. Other crosslinking monomers that could have been used include ethyleneglycol dimethacrylate, diethyleneglycol dimethacrylate, and trimethylolpropane trimethacrylate TMPTMA. It is thought that their use at less than 8% does not affect permeability.

Others monomers, such as hexafluorobutyl methacrylate, styrene, t-butylstyrene, etc. can be used to improve some properties, such as deposit resistance. Their use at less than 10% of the total composition does not significantly affect either permeability or hardness.

Preparation Procedure for Lenses Made Using Macromonomers of the Invention

I. Mixing Procedure

All liquid ingredients were weighed and mixed in screw-on-cap bottle, shaken and stirred for a while. The solid macromonomer powder is weighed and added to the liquid monomer ingredients in small portions. In order to disperse the power in the bulk of the mixture, after each addition the mixture was stirred using a magnetic stirrer, the bottle then capped and sealed properly, tumbled on a roller mill until the solution was clear and homogeneous (from several hours to several days). The initiator and any color were added and tumbled for half an hour, then poured in molds or tubes.

Polymerization Procedure

Thermal Polymerization

Solutions were poured in, nitrogen flushed aluminum tubes, capped and put in a water bath for 44 hours at 30° C. Then heated in an oven for 4 hours at 45° C., finally the temperature was raised to 110° C. for 24 hours. Sometimes an extra 24 hours at 130° C. was used. The tubes were cooled to room temperature and the rods were punched out. The rods were ground to the half inch diameter and cut to buttoms. These buttoms were then cut and lathed into lenses.

The Ultraviolet Method

After the solution is prepared, it was poured in UV-transparent button molds and placed in a UV box. Nitrogen and vacuum was applied alternatively. Irradiation was applied for 45 minutes under nitrogen atmosphere. The molds were then removed and heated for two hours at 90° C., then the temperature was raised to 110° C. for 20 hours. Buttons were punched out of the molds and faced.

Lens Manufacturing

A lathe was used to cut lenses using standard production procedures.

EXAMPLES

In the examples that follow, the compositions are expressed in terms of the weight ratios of the ingredients based on total weight of the composition.

EXAMPLE 1

TRIS//MMA 40//60 MACROMONOMER

This describes the preparation of a macromonomer composed of a block of 3-methacryloxypropyltris(-trimethylsiloxy)silane (TRIS) and a block of methyl methacrylate (MMA). The double bond is in a group attached to the TRIS block. TRIS can also be called tris(trimethylsiloxy)-gamma-methacryloxypropyl silane.

A 2 liter flask is equipped with a mechanical stirrer, thermometer, N₂ inlet, drying tube outlet and addition funnels. 3-Methacryloxypropyltris(trimethylsiloxy)silane, 120.82 gm; THF, 27.26 gm; p-xylene, 2.57 gm; tetrabutylammonium m-chlorobenzoate, 300 microliters of a 1.0 M solution; and bis(dimethylamino)methylsilane, 500 microliters were charged to the pot. Initiator 1-(2-trimethylsiloxy)ethoxy-1-trimethylsiloxy-2-methylpropene, 13.79 gm was injected and the TRIS block was polymerized. Feed I [methyl methacrylate, 183.6 gm; THF, 157.7 gm; bis(dimethylamino)methylsilane 500 microliters] was started and added over 20 minutes. At 90 minutes the reaction was quenched with methanol, 7.80 gm; H₂O, 4.59 gm; dichloroacetic acid, 20 microliters. It was refluxed for 3 hours. Then 215 gm of solvent was distilled off while 350 gm of toluene was added. The flask was distilled until the vapor temperature equaled approximately 108° C. a-Methylstyrene isocyanate (TMI from Am. Cyanamid), 12.1 gm and dibutyltin dilaurate, 150 microliters were added and refluxed for 3 hours. This puts a reactive double bond at the end of each polymer chain. Methanol, 0.62 gm, was added and refluxed 30 minutes. Butanol, 4.68 gm was added and refluxed 1 hour. The polymer solution was then poured into methanol. The solid polymer precipitated out and was dried.

This made a macromonomer of TRIS//MMA 40//60 with the polymerizable double bond next to the TRIS block. The polymer has a number average molecular weight, Mn=10,600.

EXAMPLE 2

This example uses the macromonomer that was prepared in Example 1.

| Item | Monomer Formulation* | | | Properties | |
|---|---|---|---|---|---|
| | TRIS | MMA | MACRO | DK | Hardness |
| A | 41.8 | ** | 35 | — | — |
| B | 42 | 12.8 | 35 | 68 | 82 |

**Item A included 13.0% hexafluorobutyl methacrylate instead of MMA.
*Each item included 5% MMA, 5% TEGMA polymerized using 0.2% Vazo-52, a commercial free-radical initiator.

Example 2B clearly shows the advantages of macromonomers of the invention used in contact lens formulations. The lenses made were hard, easy to cut and lathe, resistant to scratches, and had less than 15% solvent swell. The combination of hardness and oxygen permeability of lenses made with the polymer of Example 2B is significantly greater than obtained with random copolymers as listed in Comparisons 1–7.

The use of the macromonomers did not adversely affect the optical clarity of the lenses because of its compatibility with the other comonomers.

I claim:
1. An acrylic block copolymer comprised of:
   (a) 10–90% by weight of one end block derived from one or more monomers having the formula

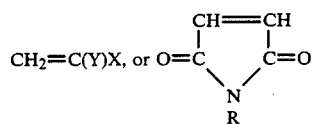

and mixtures thereof wherein: X is —CN, —CH=CHC(O)X' or —C(O)X'; Y is —H, —CH₃, —CN or —CO₂R, provided, however, when X is —CH=CHC(O)X', Y is —H or —CH₃; X' is —OSi(R)₃, —R, —OR or —NR'R"; each R is independently selected from $C_{1-20}$ alkyl, alkenyl, or alkadienyl or $C_{6-20}$ cycloalkyl, aryl, alkaryl or aralkyl, any of said groups optionally containing one or more ether oxygen atoms within aliphatic segments thereof and optionally containing one or more functional substituents that are unreactive under polymerizing conditions; and each of R' and R" is independently selected from $C_{1-4}$ alkyl; and
   (b) 90–10% by weight of another end block derived from one or more polysiloxanylalkyl esters having the formula

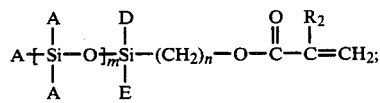

where D and E are selected from the group consisting of $C_1$–$C_5$ alkyl groups, phenyl groups, and groups of the structure

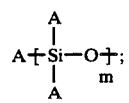

where A is selected from the group consisting of $C_1$–$C_5$ alkyl groups and phenyl groups; m is an integer from one to five; and n is an integer from one to three; $R_2$ is —H or —CH₃; and
   (c) having attached to only one of said end blocks of each molecule a terminal organo group containing a polymerizable carbon-carbon double bond.

2. A macromonomer of claim 1 wherein the organo group containing the carbon-carbon double bond is attached to the polysiloxanyl-containing block.

3. A macromonomer of claim 1 wherein the organo group containing the carbon-carbon double bond is attached to the macromonomer by means of a chemical linkage selected from the group consisting of urethane, ester, ether and amide linkages.

4. A macromonomer of claim 1 wherein said terminal organo group is selected from the group consisting of methacryloxy, acryloxy, styrenic, alpha-methylstyrenic and allylic.

5. A macromonomer of claim 4 wherein the terminal organo group is derived from alpha-methylstyrene.

6. A macromonomer of claim 1 having a number average molecular weight of from about 1,000 to 20,000.

7. A macromonomer of claim 1 having a number average molecular weight of from about 5,000 to 15,000.

8. A macromonomer of claim 1 comprising a block of methyl methacrylate units and a block of 3-methacryloxypropyl-tris(trimethylsiloxy)silane units.

9. A macromonomer of claim 7 wherein the blocks consist essentially of a block of methyl methacrylate units and a block of 3-methacryloxypropyl-tris-(trimethylsiloxy)silane units.

10. A macromonomer of claim 9 consisting essentially of about 25–75% by weight of methyl methacrylate units and about 75–25% by weight of said silane units.

11. A macromonomer of claim 1 comprised of about 15–90% by weight of one or more monomers having the formula $CH_2=C(Y)X$ wherein Y is —H, or —$CH_3$ and X is —C(O)X', where X' is —$OR_1$, and $R_1$ is selected from $C_{1-4}$ alkyl groups, and about 85–10% of 3-methacryloxypropyl-tris(trimethylsiloxy)silane.

12. A macromonomer of claim 11 wherein said terminal organo group is derived from alpha-methylstyrene.

13. A macromonomer of claim 12 having a number average molecular weight of from about 1,000 to 20,000.

14. A block copolymer of claim 1 which is an AB diblock copolymer.

15. A block copolymer of claim 14 having a number average molecular weight of from about 1,000 to about 20,000.

16. A block copolymer of claim 14 having a number average molecular weight of from about 5,000 to about 15,000.

17. A block copolymer of claim 1 wherein the blocks consist essentially of a block of methyl methacrylate units and a block of 3-methacryloxy-propyl-tris(trimethylsiloxy)silane units.

18. A block copolymer of claim 17 consisting essentially of about 25–75% by weight of methyl methacrylate and about 75–25% by weight of said silane units.

* * * * *